United States Patent [19]
Murayama et al.

[11] Patent Number: 5,536,577
[45] Date of Patent: Jul. 16, 1996

[54] MAGNETIC RECORDING MEDIUM COMPRISING A PROTECTIVE LAYER AND A LUBRICANT LAYER WHICH CONTAINS A HOST MULTIDENTATE LIGAND AND A GUEST REVERSIBLY TRAPPED LUBRICANT

[75] Inventors: Hideki Murayama, Machida; Keiichiro Sano, Kawasaki; Kazuhiko Sawada; Fumiaki Yokoyama, both of Yokohama; Haruhiko Ikeuchi, Tokyo; Yutaka Teranishi, Sagamihara, all of Japan

[73] Assignee: Mitsubishi Chemical Corporation, Tokyo, Japan

[21] Appl. No.: 313,909

[22] Filed: Sep. 28, 1994

[30] Foreign Application Priority Data

| Sep. 28, 1993 | [JP] | Japan | 5-241472 |
| Oct. 4, 1993 | [JP] | Japan | 5-248310 |
| Oct. 22, 1993 | [JP] | Japan | 5-265080 |
| Oct. 28, 1993 | [JP] | Japan | 5-270573 |
| Dec. 20, 1993 | [JP] | Japan | 5-319762 |
| Feb. 23, 1994 | [JP] | Japan | 6-025582 |
| Apr. 20, 1994 | [JP] | Japan | 6-081741 |
| Jul. 11, 1994 | [JP] | Japan | 6-158756 |

[51] Int. Cl.$^6$ ............................................. G11B 5/00
[52] U.S. Cl. ..................... 428/408; 428/694 TP; 428/694 TC; 428/694 TF; 428/900
[58] Field of Search ................ 428/694 TP, 694 TF, 428/694 TC, 900

[56] References Cited

U.S. PATENT DOCUMENTS

| 3,686,225 | 8/1972 | Pedersen | 260/340.3 |
| 3,687,978 | 8/1972 | Pedersen | 260/340.3 |
| 3,929,521 | 12/1975 | Ohr et al. | 148/6.2 |
| 4,861,662 | 8/1989 | Kobuska et al. | 428/408 |
| 5,045,165 | 9/1991 | Yamashita | 204/192.16 |
| 5,113,302 | 5/1992 | Shimizu et al. | 360/135 |

FOREIGN PATENT DOCUMENTS

| 2-139711 | 5/1990 | Japan . |
| 5-217152 | 8/1993 | Japan . |
| 6-84164 | 3/1994 | Japan . |

Primary Examiner—Stevan A. Resan
Attorney, Agent, or Firm—Oblon, Spivak, McClelland, Maier & Neustadt

[57] ABSTRACT

The lubricant layer according to the present invention is used in a thin film magnetic recording medium in which a solid surface sliding at a high speed is required to retain its lubricating performance and abrasion resistance for a long period of time, comprising a host-guest complex composed of a lubricant molecule as a guest molecule and a multidentate ligand as a host compound to form the complex with the guest molecule.

14 Claims, 6 Drawing Sheets

MAGNETIC RECORDING MEDIUM COMPRISING A PROTECTIVE LAYER AND A LUBRICANT LAYER WHICH CONTAINS A HOST MULTIDENTATE LIGAND AND A GUEST REVERSIBLY TRAPPED LUBRICANT

FIELD OF THE INVENTION

The present invention relates to a lubricant layer which is a thin layer having a lubricating function at an interface where it is subjected to a sliding contact with a solid at a high speed. More particularly, it relates to a lubricating system in a magnetic recording medium providing a high recording density used in the information industry and the like, a magnetic recording medium such as a fixed thin layer magnetic recording disk, and a method of preparing the same.

BACKGROUND OF THE INVENTION

When a magnetic recording medium is used, the medium is rotated and accelerated rapidly from a stationary state, whereby a lift is given to a head slider and a magnetic head is lifted. When the power is switched off after the use, a motor driving the medium for rotation will stop, and the head and the medium will come into contact with each other at a high speed and cause sliding.

A thin layer magnetic recording medium, which is a typical example of the magnetic recording medium providing a high recording density used in the information industry and the like, is usually prepared by coating a magnetic metal or its alloy on a non-magnetic substrate by plating, vapor deposition, or sputtering. In actual use, it becomes abraded and damaged by the sliding contact of the magnetic recording medium with the head at a high speed. Its magnetic properties may be deteriorated.

As a method for solving such a problem, it has been proposed to provide a protective layer and a lubricant layer on the magnetic layer in order to make a static and dynamic friction coefficient of the medium during the sliding contact as low as possible and to improve an abrasion resistance. A carbonaceous layer, an oxide layer, a nitride layer, or a boride layer is employed as the protective layer. A liquid lubricant or a solid lubricant is employed as the lubricant layer. Generally, a perfluoropolyether compound, which is one of the liquid lubricants, is coated on the surface of the medium.

In recent years, to obtain a higher recording density, it has become increasingly necessary to reduce the flying height of the head and to speed up the rotation of the medium. Thus, the substrate for medium has come to be smoothed. The provision of the liquid lubricant layer is very effective in reducing the dynamic friction coefficient, as mentioned in the above. As the thickness of the liquid lubricant layer increases, however, it has been found that a micromeniscus is formed by the surface tension of the liquid lubricant between the head and the medium and thereby causes sticking. Hence, this indicates that the static friction coefficient of the medium increases and the head frequently becomes inoperative due to its adhesion to the medium.

As the substrate is smoothed in order to reduce the flying height of the head, the liquid lubricant has a serious drawback in that the above-mentioned sticking is very liable to occur. On the other hand, it is disadvantageous in that a sufficient durability cannot be obtained when the thickness of the liquid lubricant layer is reduced to prevent the sticking. Further, as the rotation speed of the medium increases, there occurs a marked phenomenon called "spin-off" and the thickness of the lubricant layer is reduced. To avoid such phenomena, the search has gone on for a solid lubricant which does not form the meniscus and it has been proposed to use a higher alcohol, a higher fatty acid, or metal salts thereof.

The solid lubricant has a problem, however, in that, when it is coated on the magnetic layer, a crystallization is liable to take place in part of the coated layer which causes a cohesion, since its stable phase is as a solid at the ambient temperature. In particular, the tendency toward cohesion is marked when the substrate is smoothed. When the cohesion occurs, the thickness of the coated layer becomes uneven, which increases the possibility that the head will be brought into direct contact with the magnetic layer of the medium. In addition, a stain may form on the head slider or the flying height of the head may be made unstable. In order to prevent the cohesion of the solid lubricant and to prevent the spin-off, it is necessary to effectively bind and cause the molecules of the solid lubricant to adhere to the substrate. One approach that has been proposed to increase the bonding strength of the molecules of the lubricant has been a method of polymerizing an alkylsilane (Japanese Unexamined Patent Publications No. 103721/1990 and No. 103722/1990). However, according to this method, the lubricant is polymerized, whereby the movement of their molecules is restricted and the lubricating performance becomes inadequate. This is because there is a trade-off to be made between the fixation of the lubricant and its lubricating performance.

Further, even though the solid lubricant exerts a good lubricating performance in the initial stage, the friction coefficient markedly increases with the passage of time and no satisfactory lubricating performance can be obtained. The higher fatty acid, which has the effect of fairly maintaining the friction coefficient at a low level, has the disadvantage of becoming easily liquefied under the conditions in which it is brought into contact with the head at 50° C. or higher because it generally has a low melting point and therefore has a tendency to cause the sticking of the head. On the one hand, to avoid such a disadvantage, it has been proposed to use the higher fatty acid in the form of a metal salt which has a higher melting point (e.g., Japanese Unexamined Patent Publication No. 281220/1988). The metal salt of higher fatty acid has a good lubricating performance. On the other hand, it has a drawback in that its solubility in a common organic solvent is poor and thus its coating possibilities are limited. In addition, there are problems in that an even coated layer is hardly obtained when the metal salt is coated on the medium and the thickness of the coated layer is considerably uneven. This tendency toward unevenness is particularly marked when the substrate is smoothed, which may possibly lead to serious results such as a head crash.

A reversible adhesion is ideal as a fixation system in which the lubricant molecules interact with the substrate while retaining the strength enough to prevent the cohesion and the adhesion does not use a trade-off with the lubricating performance.

An object of the present invention is to obtain a lubricant layer which is a thin layer but which has an excellent lubricating performance and is free from the cohesion of the lubricant molecules, that is, a lubricant layer excellent in durability without introducing a trade-off between the adhesion of the lubricant and its lubricating performance. The present invention has been achieved by designing the lubricating system at a molecular or atomic level. The present invention also provides a magnetic recording medium having an even and thin lubricant layer which is excellent in lubricating performance and durability and which is formed by using the above lubricant layer.

SUMMARY OF THE INVENTION

More specifically, in the lubricant layer of the present invention, the lubricating molecule, which is the guest molecule, is trapped by the host compound adhering to a solid substrate through electrostatic interaction such as an ionic bond so that the lubricant molecule can be fixed to the solid substrate with a good orientation and its manner of bonding can be made reversible. Therefore, there has been achieved not only the prevention of the cohesion of the lubricant but also the provision of a more excellent durability and lubricating performance.

The lubricant layer of the present invention can be applied to various solid surfaces including, for example, polymer, carbon, oxide, nitride, boride, and metal. Thus, it can be widely applied to any solid surface irrespective of its nature as long as the host compound can be adhered thereon.

The flying height of the head can be reduced when the lubricant layer of the present invention is applied to the surface of the magnetic recording medium. Hence, it is possible to enhance the recording density of the magnetic recording medium and to construct a magnetic recording system which will remain reliable for a long period of time.

DETAILED EXPLANATION OF THE INVENTION

The present invention is described in detail below with reference to an example in which the present invention is applied to the magnetic recording medium.

Figure 1:
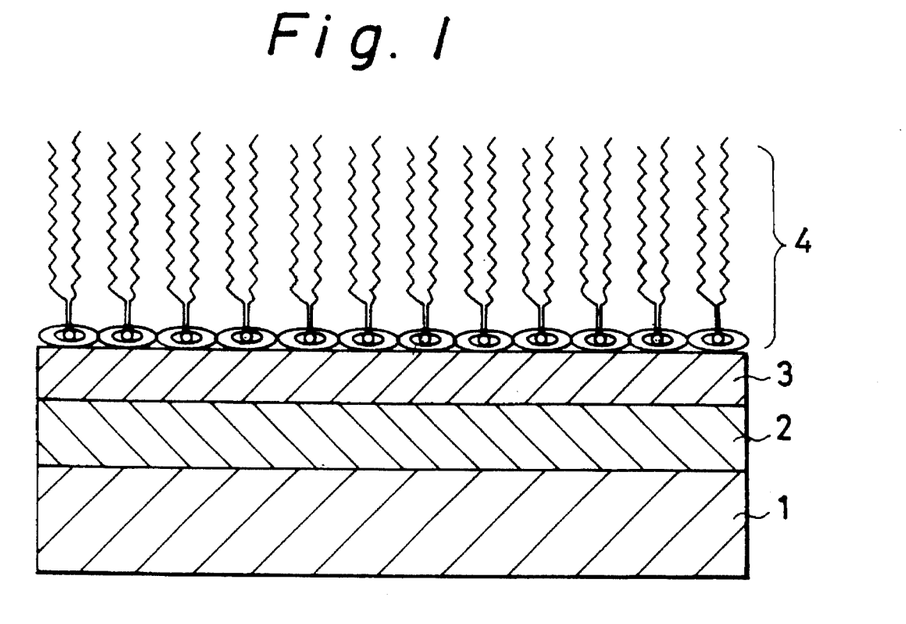

FIG. 1 shows a construction where the lubricant layer of the present invention is applied to the magnetic recording medium. In the magnetic recording medium comprising a non-magnetic substrate 1 on which a magnetic layer 2, a protective layer 3, and a lubricant layer 4 are successively formed, the lubricant layer 4 comprises a host-guest complex in which a lubricant molecule is fixed as a guest molecule through a host compound adhering to the medium. In FIG. 1, the protective layer 3 may be optionally arranged and the lubricant layer of the present invention may be directly formed on the surface of the magnetic layer 2.

A multidentate ligand having a polar functional group suitable for forming a hydrogen bond relating to a hydroxyl group, an amino group, and the like can be fixed on the surface of the medium through the electrostatic interaction. It is possible to prevent the lubricant molecules from cohering with each other when the lubricant layer is constituted in such a manner that the lubricant molecule is coordinated with the multidentate ligand adhering to the surface of the medium. To coordinate the lubricant molecule with the multidentate ligand adhering onto the surface of the medium means that all of the long chain molecular moieties are oriented upward against the surface of the medium, in principle. As a result, the orientation of the entire lubricant layer is improved to form an ideal structure for the lubricant layer, which provides an excellent lubricating performance and durability, notwithstanding the fact that the thickness of the lubricant layer corresponds to that of a mono layer.

When the lubricant layer according to the present invention is applied to the magnetic recording media, it is usually common to employ as the non-magnetic substrate an aluminum alloy plate or a glass plate having a nickel-phosphorus layer formed by electroless plating or sputtering. A ceramic substrate, a carbonaceous substrate, or a resin substrate can also be used. It is recommended to adjust the average roughness of the surface of the substrate to 20 to 100 Å, preferably 30 to 80 Å, by texturing it in order to reduce the possible contact area with the head and bring out a more excellent tribology performance.

The magnetic layer is formed by coating a Co or Co-containing alloy such as a CoP alloy, a CoNiP alloy, a CoNiCr alloy, a CoNiPt alloy, a CoCrPt alloy, a CoCrTa alloy, or a CoCrPtTa alloy by electroless plating or sputtering, after a undercoating layer is formed, if necessary. The thickness of the magnetic layer is determined depending on the properties required as the magnetic recording medium and usually ranges from 100 to 1,500 Å, preferably from 150 to 800 Å. When the lubricant layer of the present invention is applied, the protective layer on the thin magnetic layer is not necessarily required and may be formed if necessary taking into account the physical properties such as the hardness or elasticity of the magnetic layer. A carbonaceous layer, an oxide layer, a nitride layer, or a boride layer is employed as the protective layer. It can be formed by sputtering, ion plating, or plasma polymerization. A carbonaceous layer such as amorphous carbon or hydrogenated carbon with the thickness of usually from 50 to 500 Å, and preferably from 100 to 300 Å is usually used as the protective layer. If necessary, the protective layer may be subjected to a surface treatment such as oxidation.

When a carbonaceous layer is formed as the protective layer, the number of acidic functional groups on the surface of the carbonaceous protective layer can be increased by, for example, a wet treatment such as a method comprising immersing the layer in a solution containing an oxidant and a dry treatment such as a method comprising irradiating the layer with ultraviolet rays in an atmosphere of an oxygen-containing gas. The dry treatment is preferable from the industrial viewpoint. A specific example of the dry treatment includes a method comprising irradiating the carbonaceous protective layer with ultraviolet rays having a wavelength of from 185 to 254 nm and an output of 50 W or more at a distance of from 10 to 50 mm for 30 seconds to 15 minutes, preferably 1 to 5 minutes. An increase in the number of acidic functional groups on the surface of the carbonaceous protective layer can be confirmed by the quantitative determination of oxygen atom on the surface and the ratio of the C=O bond to the C—C bond and the C—H bond through X-ray photoelectric spectrometry (hereinafter referred to as XPS). The XPS analysis can be carried out using $AlK_\alpha$ rays at an outlet angle of 65° (analysis depth up to 50 Å). According to the present invention, the ratio of the C=O bond to the C—C bond and the C—H bond is required to be 0.05 or more, preferably ranging from 0.05 to 0.3, and more preferably within the range of from 0.07 to 0.2.

Figure 2:
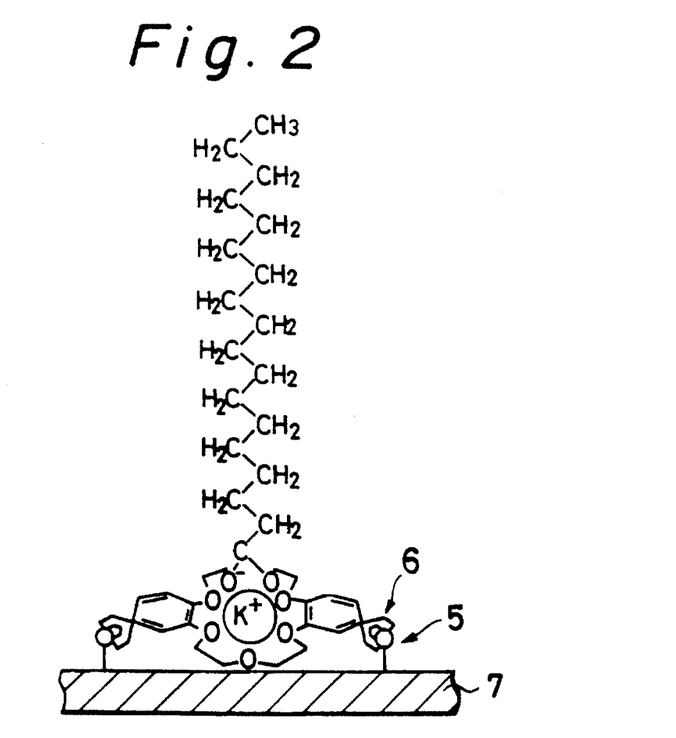

FIG. 2 shows the diagram of an 18-crown-6 derivative and potassium stearate forming a host-guest complex and the complex adhering to the surface of the carbonaceous protective layer of the medium. $K^+$, which is a cation in the guest compound, is trapped in the internal cavity of the crown ether, and stearate, which is a counter anion of $K^+$, is coordinated on the crown ether in such a manner that its terminal carboxyl group as an ionic pair is oriented toward the trapped $K^+$. Therefore, since the host compound, crown ether, adheres by binding to an acidic functional group 5 on the surface of the carbonaceous protective layer 7 at the binding site 6 and an alkyl chain moiety of the guest compound, potassium stearate, that is, a stearyl group, is oriented upward against the substrate, the orientation of the whole lubricant layer is improved to form an ideal structure for a lubricant layer, which provides an excellent lubricating performance and durability, notwithstanding the fact that the thickness of the lubricant layer corresponds to that of a mono layer. Further, the cohesion of the lubricant is suppressed by adhesion.

Figure 3:
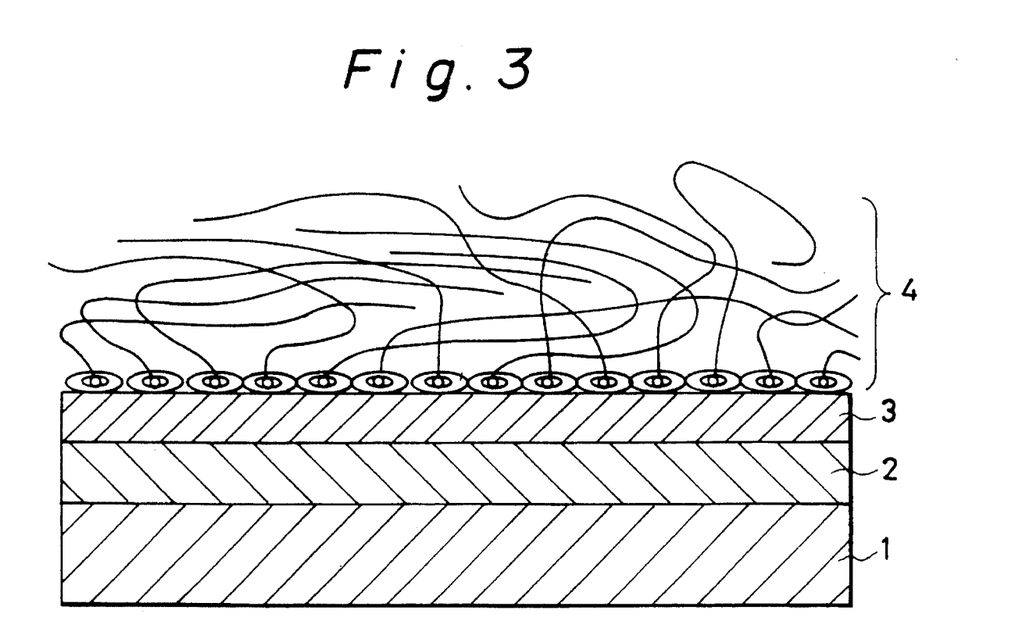

In the host-guest complex constituting the lubricant layer of the present invention, a usable guest molecule is one having a molecular structure bearing a lubricating function and a binding site for binding to a host molecule. Both the liquid lubricant structure and the solid lubricant structure can be employed as the molecular structure bearing a lubricating function. An alkyl fluoride liquid lubricant such as perfluoropolyether, polybutene, polyalkylene glycol, phosphate, polyolefin, polyol ester, alkylnaphthalene, silicone oil, polyarylalkane, polyphenyl, silicate, or polyphenyl ether can be used as the liquid lubricant structure. Examples of the perfluoropolyether liquid lubricant include a Fomblin lubricant: $-(CF_2CF_2O)_m(CF_2O)_n-$ structure (manufactured by Mount Edison), a DEMNUM lubricant: $-(CF_2CF_2CF_2O)_p-$ structure (manufactured by DAIKIN INDOSTRIES LTD.) and a KRYTOX lubricant: $-(CF_2CF(CF_3)O)_q-$structure (manufactured by DuPont) (m, n, p, or q is an integer of not less than 1). The lubricant in which m, n, p, or q is 5 to 50 is usually used. Its molecular weight is preferably not less than 500, and particularly ranges from 600 to 8,000. A branched or straight, saturated or unsaturated, higher aliphatic hydrocarbon chain, a higher aliphatic hydrocarbon chain containing an aromatic group, or a heteroatom or a long chain structure in which a part or all of the above-described higher aliphatic hydrocarbon chain forms a polyether chain may be bound to the perfluoropolyether molecular structure. FIG. 3 shows the diagram of the lubricant layer containing the host-guest complex according to the present invention in which the crown ether is used as the liquid lubricant.

The solid lubricant can take any structure such as a branched or straight, saturated or unsaturated, higher aliphatic hydrocarbon chain, the above-described higher aliphatic hydrocarbon chain containing an aromatic residue such as benzene, naphthalene, or pyrene or a heteroatom such as F, N, O or S, or a long chain in which a part or all of the above-described higher aliphatic hydrocarbon chain forms a polyether chain. Any structure can be used independent of the nature of bond as long as it has a lubricating function. The carbon number contained in the long chain is preferably 8 or more, and more preferably 12 or more. Since its solubility in a solvent may become poor when the chain length of a straight chain alkyl group is too long, the simple straight chain alkyl group (i.e., comprising carbon-carbon bonds such as continuous methylene-methylene bonds) preferably has 24 or fewer carbon atoms. Specific examples thereof include long chain aliphatic carboxylic acids such as stearic acid, compounds containing plural long chain alkyl groups such as β-(N,N-diheptadecylaminocarbonyl)propionic acid, phosphoric acid esters of long chain aliphatic compounds such as dioleyl phosphate, dithiophosphoric acid ester of long chain aliphatic compounds, long chain aliphatic sulfonic acids, sulfuric acid esters of long chain aliphatic compounds, and long chain aliphatic alcohols such as stearyl alcohol.

The binding site for binding the lubricant compound to the host compound is selected so that the binding site can be trapped in the cavity of the host compound. Alkaline metals such as Na, K, or PaD, alkaline earth metals such as Mg, Cs, Sr, or Ba, typical metals such as Al, Sn, or Pb, or transition metals such as Ag, Cu, or Fe are usually used for binding to the terminal group of the molecular structure bearing the lubricating function. Specific examples of the terminal group include an oxygen-containing polar functional group such as a hydroxyl group, a carboxyl group, an ester bond, or an amide bond, a nitrogen-containing functional group such as an amino group or an imino group, a phosphorus-containing functional group such as phosphoric acid or phosphoric acid ester and a sulfur-containing functional group such as a mercapto group, a sulfonic acid group, or sulfonic acid ester. These terminal groups or the lubricants having an ammonium salt or an amine acid salt at the terminal can also be used alone, without combining them with metal ions as an organic ion. In this case, the terminal functional group of the lubricant molecule is trapped in the cavity of the host molecule. K, Ba, Ag, Cu, an amino group, an ammonium salt or a hydroxyl group is particularly preferred as the binding site. The surface of the carbonaceous protective layer having an acidic functional group can be effectively fixed by using as the host compound the multidentate ligand to which the basic functional group such as amino group or imino group has been introduced.

A multidentate ligand capable of effectively trapping a metal ion or an organic ion, including cyclic esters, polyethers, polyols, polyamines, cyclic ethers called crown ether or cyclofructans, cyclic ether amines called cryptand or cryptate, cyclic amines, polypeptides, and their chemically modified forms can be used as the host molecule. The multidentate ligand having terminal functional groups bearing the electrostatic interaction can also be used as the host molecule. Cyclic ligands such as crown ether or cryptand are particularly useful. Examples of the cyclofructans include those containing 18-crown-6 as a basic structure such as cycloinulohexaose and analogs thereof, those containing 4,4'-dihydroxydibenzo-18- crown-6 or 21-crown-7 as the basic structure such as cycloinuloheptaose and those containing 24-crown-8 as the basic structure such as cycloinulooctaose. Cycloinulohexaose or 4,4'-dihydroxydibenzo-18-crown-6 is particularly preferably used. A cyclic amine such as 1,4,8,11-tetraazacyclotetradecane or N,N'-dibenzyl-4,13-diaza-18-crown-6 can also be used. A compound containing three or more donor atoms of at least one element such as O, N, or S is suitably used as the multidentate ligand. The donor atoms of the multidentate ligand preferably contains a lone electron pair having an $sp^3$ hybrid orbital.

Figure 4:
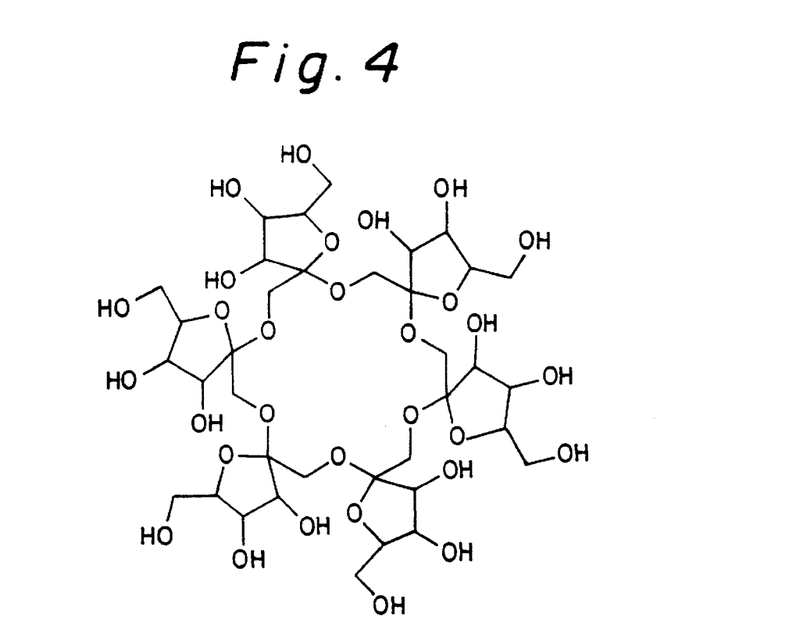

FIG. 4 shows the structure of cycloinulohexaose among the cyclofructans formed by binding a fructose molecule via a β-(2→1) bond, as an example of the multidentate ligand used in the magnetic recording medium according to the present invention. The multidentate ligand is required to have two or more functional groups, and preferably four or more functional groups, per molecule, bearing an electrostatic interaction such as a hydroxyl group as well as a cyclic ligand portion trapping a metal ion, like cyclofructans as shown.

The multidentate ligand forms a strong complex with a metal ion or an organic ion. For example, since the lone electron pair such as O or N contained in the cyclic ligand such as crown ether or cryptand is located in the internal cavity of the ligand and shows high affinity for a metal ion and the like, the equilibrium of the complex formation usually inclines toward the side of the complex formation within a range of from $10^2$ to $10^{10}$ to trap the metal ion very strongly. Namely, in the cyclic ligand, O or N is coordinated as a donor atom by the electrostatic interaction with the lone electron pair as the main driving force, and a metal cation is effectively trapped in the internal cavity of the ligand. Compared to a monodentate ligand, these cyclic ligands have great advantages in that no new repulsion between donors occurs when they are coordinated around the cation since the donor atom such as O or N is originally linked via a methylene bridge, which is advantageous to the complex formation in terms of enthalpy, and also have advantage in view of entropy because of the suitable placement of the donor atoms. A straight chain multidentate ligand is useful as well as the cyclic multidentate ligand, but it has been found that the stability of the complex increases in the case of using the cyclic ligand as compared to the straight chain ligand. This may be attributed to the electrostatic and stearic repulsion between the donor atoms at both ends and the disadvantageous change of entropy though the straight chain multidentate ligand is superior to the monodentate ligand in trapping of a cation. There are several reviews on the above-mentioned cyclic ligands. For example, J. J. Christensen et al. describe a detailed table reciting the synthetic methods, structure, and cation to be trapped concerning typical ligands, crown ether, cryptand, and their analogs, in Chem. Revs., 74, 351 (1974). From the viewpoint of stability as a substance, many cyclic multidentate ligands are thermally stable. It has been reported, for example, that dibenzo-18-crown-6 can be distilled at 380° C. (C. J. Pederson et al., Angev. Chem., Int'L, Ed. 11, 16 (1972)).

It has been found that there is a close relationship between the size of the internal cavity of the cyclic ligand and the size of the cation to be easily trapped upon the complex formation. For example, 18-crown-6 having an internal cavity diameter of from 2.6 to 3.2 Å has been known to form a very stable complex with alkaline metal $K^+$ having an ion diameter (2.66 Å) which is almost in conformity with the internal diameter (complexing equilibrium constant in methanol $\log K=6.05$).

Figure 5:
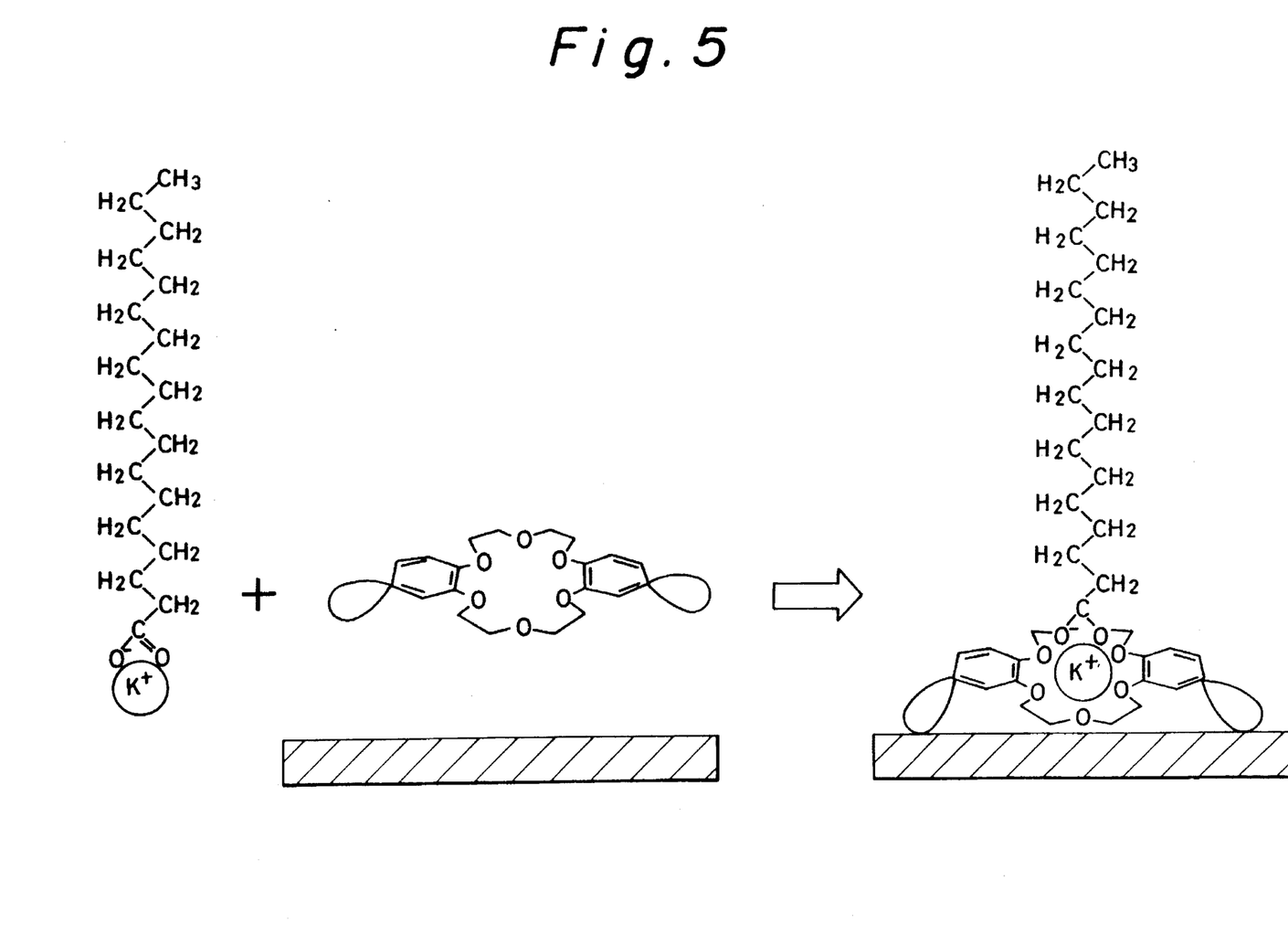

Thus, on the one hand, the lubricant molecule (guest molecule) can be fixed onto the substrate through an electrostatic interaction by forming a complex composed of the lubricant molecule and the multidentate ligand (host compound) adhering onto the solid substrate as a specifically stable host-guest complex. FIG. 5 shows the diagram of the manner of adhesion of the host-guest complex composed of 18-crown-6 derivative and potassium stearate to the surface of the solid substrate. $K^+$, which is a cation in the guest molecule, is trapped in the internal cavity of the crown ether and stearate, which is a counter anion of $K^+$, is coordinated on the crown ether in such a manner that its terminal carboxyl group as an ionic pair is oriented toward the trapped $K^+$. On the other hand, the host molecule, crown ether, can be fixed onto the disk surface by, for example, adequate chemical modification. Hence, the terminal carboxyl group of the lubricant moiety (a long chain alkyl stearate group) is fixed onto the crown ether complex on the substrate surface, which prevents the lubricant molecules from cohering with each other. To coordinate the terminal carboxyl group to the crown ether complex on the substrate means that all of the alkyl chain are oriented upward against the substrate in principle. As a result, the orientation of the entire lubricant layer is improved to form an ideal structure of the lubricant layer, which provides an excellent lubricating performance and durability, notwithstanding the fact that the thickness of the lubricant layer corresponds to that of a mono layer.

Figure 6:
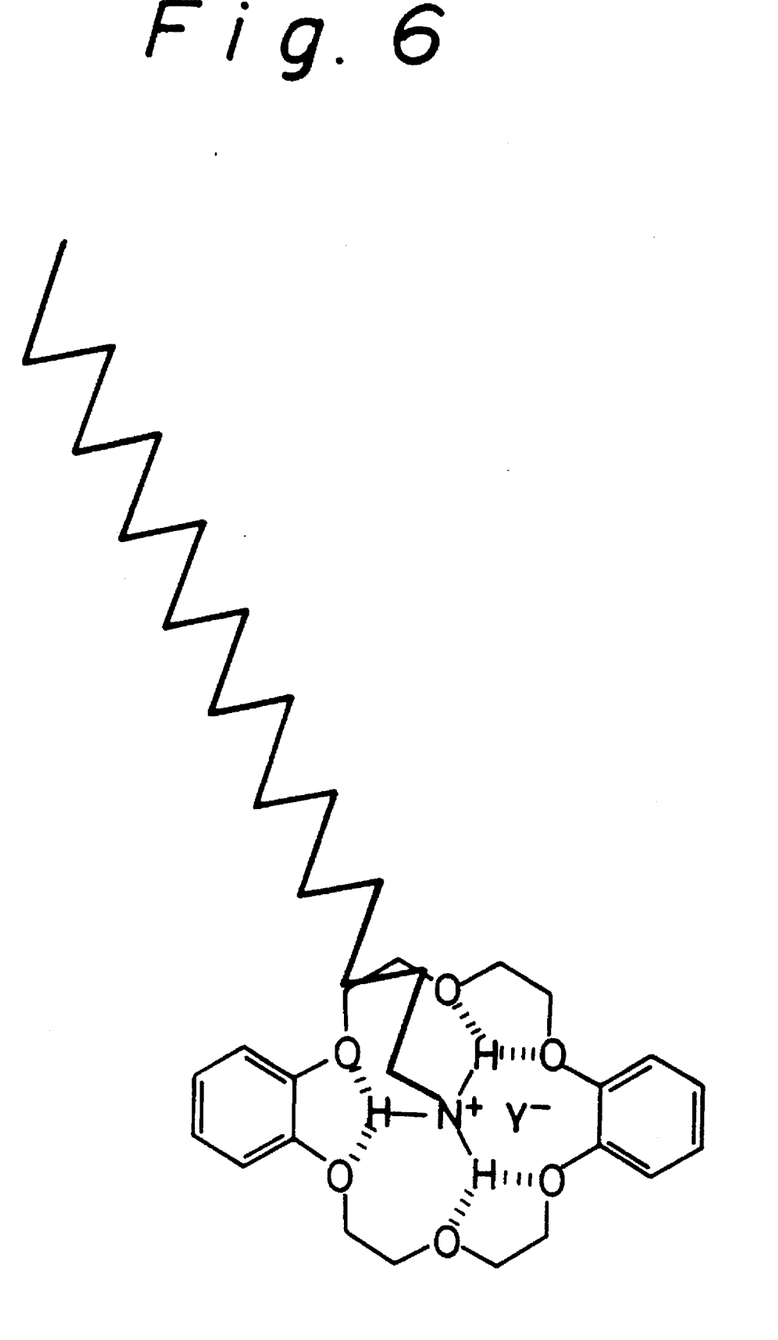

Similarly, the lubricant having excellent properties can be obtained by forming the host-guest complex through electrostatic interaction using an organic compound having a polar functional group such as amino group and the multidentate ligand. An example is the host-guest complex composed of long chain aliphatic amine as the guest lubricant molecule and the 18-crown-6 derivative shown in FIG. 6. In this case, the binding site which interacts with the multidentate ligand is located on the ligand and the complex is formed in such a manner that the lubricant moiety is arranged on the multidentate ligand, such as in the case of using potassium stearate as the guest compound.

The lubricant layer containing the host-guest complex can be formed on the solid substrate by mixing the multidentate ligand used as the host compound with the lubricant molecule used as the guest compound and coating the resulting mixed solution in which the host-guest complex is formed on the disk. The multidentate ligand is adsorbed by or adheres to the surface of the solid substrate through interaction with the solid surface by using the mixed solution to form a layer structure in which the lubricant molecule is coordinated on the solid surface.

The lubricant layer can be formed by coating a host-guest complex composed of a multidentate ligand (a host compound) having a function to trap a metal ion or an organic ion and a lubricant molecule (a guest compound) comprising an organic ion to which a molecular structure bearing a lubricating function is bound or a metal ion to which a counter anion bearing a lubricating function is bound.

Alternatively, the host-guest complex lubricant layer can be formed by a method comprising forming of the multidentate ligand layer to serve as the host compound on the surface of the substrate and then forming the lubricant molecule layer to serve as the guest compound to form the host-guest complex with the host compound. According to this method, since the multidentate ligand layer is certainly adsorbed by or adheres to the solid surface and can then form the host-guest complex with the lubricant molecule, an elaborate lubricant layer can be formed more reliably when not only the lubricant molecule having a very high molecular weight but also the lubricant molecule having a comparatively low molecular weight is used as the guest molecule. The latter method is preferred to the method of using a mixed solution of the host-guest complex in cases where it is difficult to fix the host compound onto the solid surface elaborately, for example, in the case where the lubricant chain is very long and steric hindrance cannot be ignored.

It is possible to form the multidentate ligand layer on the solid surface and then form the lubricant molecule layer on the multidentate ligand layer. If the multidentate ligand layer is unnecessarily thick, the surplus part of the multidentate ligand may be removed, leaving only a layer adsorbed or fixed onto the solid surface, and then the lubricant molecule layer is formed. As a result, the thickness of the entire lubricant layer can be made thin to enhance the adherence between the lubricant molecule and the solid surface via the multidentate ligand layer.

The surplus part of the multidentate ligand layer can usually be removed by a method comprising rinsing with a solvent capable of dissolving the multidentate ligand or a method comprising a physical treatment. Examples of the rinsing method include a method comprising immersing the disk on which the multidentate ligand layer is formed in the solvent and then raising it to wash the disk surface with the solvent. Even though the solvent is required to have the ability to dissolve the multidentate ligand, the use of a solvent so strong that it completely elutes the multidentate ligand layer adsorbed or fixed onto the solid surface is to be avoided, however. It is preferable from the industrial viewpoint to use the same solvent as the one to be used for the lubricant solution in the subsequent step of forming the lubricant layer because the lubricant solution then cannot be contaminated with the multidentate ligand upon the formation of the lubricant layer.

In the case that the host-guest complex lubricant layer is formed so as to have a structure such that the counter anion having a lubricating performance is fixed through the metal ion trapped by the multidentate ligand, that is, the host compound, having a function to trap the metal ion, the method of forming the lubricant layer includes, a method comprising preparing a solution in which a metal salt of the lubricant molecule and the multidentate ligand are dissolved or dispersed or a solution in which the lubricant molecule, a metal compound, and the multidentate ligand are dissolved or dispersed, and coating this mixed solution on the substrate surface and a method comprising forming a multidentate ligand-adhering layer on the substrate surface and then forming the lubricant molecule layer on the multidentate ligand layer using a solution containing the lubricant molecule.

In the method comprising forming a multidentate ligand-adhering layer on the substrate surface and then forming the lubricant molecule layer on the multidentate ligand layer using a solution containing the lubricant molecule, a solution containing the lubricant molecule and the metal compound or a metal salt of the lubricant molecule may be coated on the substrate surface after a solution of the multidentate ligand is coated thereon. Alternatively, the lubricant molecule-containing solution may be coated on the substrate surface after the multidentate ligand solution in which the metal compound is mixed is coated thereon. According to this method, since it is possible to form the multidentate ligand layer on the substrate and thereafter form the host-guest complex with the lubricant molecule, the desired host-guest complex can be reliably constructed not only when the molecular weight of the lubricant molecule is comparatively low but also when the molecular weight is high, such as is the case with a polymer.

A case may arise in which the isolation and purification step of the guest compound to prepare the metal salt requires a large amount of solvent and prolonged time. In this instance, using a solution in which a multidentate ligand having the function to trap a metal ion, a metal compound, and a lubricant molecule having active hydrogen are dissolved or dispersed, where the lubricant molecule has a functional group capable of forming an ionic pair with the metal ion, like a carboxyl group, at its terminal, a compound difficult to be isolated and purified in the form of a metal salt, or a compound which cannot be isolated and purified can be employed as the lubricant molecule to be used for the host-guest complex lubricant layer. To omit the isolation and purification step is industrially advantageous in obtaining the lubricant layer which is more widely usable.

Any metal compound can be employed as long as its metal ion can be subjected to cation-exchange with active hydrogen (proton) at the terminal of the above lubricant molecule. The metal compound is preferably soluble in water or an organic solvent. Examples thereof include a salt such as alcoholate, phenolate, and the like, with an alkaline metal compound including a hydroxide such as potassium hydroxide and the like being preferred.

The multidentate ligand having the function to trap a metal ion, the metal compound, and the lubricant molecule having active hydrogen are dissolved in a solvent independently or in an appropriate combination and the thus-obtained solution can be coated on the solid surface. For example, in a system using 4,4'-diaminodibenzo-18-crown-6 as the multidentate ligand, potassium hydroxide as the metal compound, and stearic acid as the lubricant molecule, stearic acid and 4,4'-diaminodibenzo-18-crown-6 are dissolved in chloroform or methanol, potassium hydroxide is dissolved in methanol or water, and a mixed solution of 4,4'-diaminodibenzo-18-crown-6, potassium hydroxide, and stearic acid can be prepared by using these solutions. In a case where the three are independently dissolved or two of them are combined, dissolved in a solvent, and coated on the solid substrate, it is preferable to coat the solution containing the multidentate ligand first on the solid surface. An elaborate lubricant layer can be prepared more reliably even when the lubricant molecule has as high a molecular weight as a polymer or when it has a comparatively low molecular weight. The lubricant layer formed by coating the multidentate ligand having the function to trap the metal ion, the metal compound, and the lubricant molecule having active hydrogen independently as a material on the solid substrate shows the same ability as the lubricant layer formed using the guest compound which has been isolated and purified as a metal salt.

As the method of forming the lubricant layer, each compound can also be affixed to the solid substrate by a dry process such as vapor deposition. In this case, the multidentate ligand, the metal compound, and the lubricant molecule may be adhered simultaneously or successively. In the case of successive adherence, the metal compound can be introduced into the step of affixing the multidentate ligand or the lubricant molecule to form the lubricant layer in two steps.

The host-guest complex composed of the above-described host and guest compounds may be obtained in the form of a solution or a dispersion by dissolving or dispersing the host compound and the guest compound in a solvent. It may be obtained by mixing their solutions or dispersions which have been prepared in advance. One of the main characteristics of the host-guest complex is that, if a guest compound is insoluble in an organic solvent like a metal salt, the complex formed with such a guest compound and a host compound soluble in an organic solvent may dissolve in a commonly employed organic solvent. For example, a metal salt of a higher fatty acid such as potassium stearate, which is a typical lubricant, is hardly dissolved in an organic solvent such as chloroform, while a host-guest complex composed of it and 18-crown-6, which is a typical host compound, dissolves well in an organic solvent. This is because the crown ether solubilizes potassium stearate by trapping a potassium ion therein. An organic solvent or water can be used as a solvent in the formation of the host-guest complex. Examples of the organic solvent are commonly employed organic solvents having a comparatively low boiling point, for example, including halogenated hydrocarbons such as chloroform, fluorocarbon solvents, alcohols such as methanol or ethanol, ethers such as diethyl ether, tetrahydrofuran, ketones such as acetone or 2-hexanone, aromatic hydrocarbons such as toluene, aliphatic hydrocarbons such as hexane, and esters such as ethyl acetate, which may be used alone or as a mixed solvent.

The thus-obtained solution or dispersion of the host-guest complex can be coated on the solid surface as a lubricant as is or after adjusting its concentration.

The lubricant containing the host-guest complex can usually be coated on the surface of the solid substrate by immersing the solid substrate in the solution. It may also be coated by a method comprising bringing a tape or the like impregnated with the solution into contact with the surface of the solid substrate with a load to form a coated layer, a method comprising affixing it by rotating a pad on the solid substrate, or a spray coating method, the LB method, and the like. The concentration of the coating solution varies depending on the solutes or solvents to be used, but it usually ranges from 0.1 to 5 g/l in terms of a total solute. The thickness of the lubricant layer varies depending on the host compound and the guest compound to be used, but it usually ranges from 10 to 100 Å, preferably 10 to 50 Å.

EXAMPLES

The following Examples will be provided to illustrate the present invention in detail, but should not be understood to limit the present invention unless it goes beyond the scope of the invention.

Example 1

A chromium undercoating layer (2,000 Å), a magnetic layer of a cobalt alloy (400 Å), and a carbonaceous protective layer (300 Å) were formed in order on an aluminum alloy substrate by sputtering to obtain a magnetic disk having a diameter of 3.5 inches. The resulting disk was immersed in a chloroform solution containing potassium stearate and 4,4'-diaminodibenzo-18-crown-6, each in a concentration of 1 mmol/l (0.713 g/l in total) for 5 minutes and was raised at a rate of 10 mm/s to form an even lubricant layer having a thickness of 29 Å on the disk surface.

4,4'-Diaminodibenzo-18-crown-6 was obtained in the isolation yield of 90% by reducing 4,4'-dinitrodibenzo-18-crown-6 with hydrazine by reference to the method of E. Shchori et al. (J. Am. Chem. Soc., 95, 3842 (1973)). 4,4'-Dinitrodibenzo-18-crown-6 was obtained in the isolation yield of 81% by the nitration of a commercially available dibenzo-18-crown-6 by reference to the method of W. M. Freigenbaum et al. (J. Polym. Sci., Part A-1, 9, 817 (1971)).

The disk on which the lubricant layer was formed was subjected to a lubricating performance test and a cohesion test. The lubricating performance test was carried out by continuously sliding the disk by the use of a thin film head slider under conditions of a load of 9.5 gf and a sliding linear rate of 0.32 m/s (30-mm radius, 100 rpm) and measuring the friction force after 2 hours of continuous sliding. The cohesion test was carried out by allowing the disk to stand in the atmosphere at a constant temperature and a constant humidity and observing the cohesion or crystallization under an optical microscope. The results are shown in Table 2.

Example 2

The same disk as used in Example 1 was immersed in a chloroform containing potassium β-(N,N-diheptadecyl-aminocarbonyl)propionate and 4,4'-diaminodibenzo-18-crown-6, each in a concentration of 1 mmol/l (1.02 g/l in total) for 5 minutes and was raised at a rate of 10 mm/s to form an even lubricant layer having a thickness of 45 Å on the disk surface.

The disk on which the lubricant layer was formed was subjected to a lubricating performance test and a cohesion test in the same manner as in Example 1. In the lubricating performance test, the friction force was measured after 10 minutes and after 2 hours of continuous sliding. The results are shown in Table 2.

Example 3

A chromium undercoating layer (1,200 Å), a magnetic layer of a cobalt alloy (500 Å), and a hydrogenated carbonaceous protective layer (200 Å) were formed in order on a smooth aluminum alloy substrate having an average central line roughness (Ra) of 35 Å, by sputtering to obtain a magnetic disk having a diameter of 3.5 inches. The disk was irradiated with ultraviolet rays having a wavelength of 185 nm and 254 nm and an output of 90 W from a distance of 15 mm for 5 minutes in the air, followed by dipping in a chloroform solution containing 4,4'-diaminodibenzo-18-crown-6-ether in a concentration of 2 mmol/l (0.781 g/l) to form an even layer having a thickness of 15 Å on the disk surface.

The resulting disk was then immersed in a chloroform for 5 minutes and was raised to leave an even layer having a thickness of 5 Å on the disk surface.

An even layer having a thickness of 25 Å was formed on the disk surface by dipping in a solution of DEMNUM SH (one-end COOH-denatured product; average molecular weight: 1,650; manufactured by DAIKIN INDUSTRIES, LTD.) and potassium hydroxide dissolved in a fluorine solvent PF5080 (a solution manufactured by SUMITOMO 3M LIMITED), each in a concentration of 0.33 mol/l.

The disk on which the lubricant layer was formed was subjected to a lubricant spin-off test and a contact start and stop test (CSS test). The results are shown in Table 1. The spin-off test was carried out by rotating the disk in an atmosphere of 80° C. for 14 days at 7,200 rpm and determining the percentages of the residual thickness of the lubricant layer from the change in the absorption intensity of C—F bond in the FTIR spectrum.

The CSS test was carried out using a 70% thin film head slider (material: $Al_2O_3$ .TiC; a pressing load: 6 gf) which was raised to 75 nm at a peripheral speed of 8.7 m/s. One CSS cycle took 12 seconds, consisting 3 seconds for turning on the electricity to a spindle and 9 seconds for switching the electricity source off. The torque at the time of the initiation of spindle rotation and the torque during sliding were measured in each cycle. The torque during sliding was calculated from a maximum power acting on the head between 0.3 second and 1 second after turning on the electricity to the spindle. 20,000 CSS cycles were conducted and the average values of the torque at the time of the initiation of the rotation and the torque during sliding were calculated from the ten highest values. No stain was observed on either the disk or the head after the CSS test.

Example 4

The same disk as used in Example 3 was subjected to ultraviolet rays irradiation and an even layer having a thickness of 18 Å was formed on the disk surface by dipping in a chloroform solution containing 4,4'-diaminodibenzo-18-crown-6 in a concentration of 2 mmol/l (0.781 g/l).

The resulting disk was then immersed in a chloroform for 5 minutes and was raised to leave an even layer having a thickness of 9 Å on the disk surface.

An even layer having a thickness of 26 Å (Example 4-1, for a spindle test) or 24 Å (Example 4-2, for a CSS test) was formed on the disk surface by dipping in a PF5080 solution containing DEMNUM SH (average molecular weight: 2,400) and potassium hydroxide, each in a concentration of 0.4 mmol/l.

The disk on which the lubricant layer was formed was subjected to a spindle test or a CSS test in the same manner as in Example 3. The results are shown in Table 1. No stain was observed on either the disk or the head after the CSS test.

Example 5

The same disk as used in Example 3 was subjected to ultraviolet rays irradiation and an even layer having a thickness of 16 Å was formed on the disk surface by dipping in a chloroform solution containing 4,4'-diaminodibenzo-18-crown-6 in a concentration of 2 mmol/l (0.781 g/l).

The resulting disk was then immersed in a chloroform for 5 minutes and was raised to leave an even layer having a thickness of 8 Å on the disk surface.

An even layer having a thickness of 44 Å was formed on the disk surface by dipping in a PF5080 solution containing DEMNUM SH (average molecular weight: 2,400) and potassium hydroxide, each in a concentration of 0.6 mmol/l.

The disk on which the lubricant layer was formed was subjected to a spin-off test in the same manner as in Example 3. The results are shown in Table 1.

Example 6

The same disk as used in Example 3 was subjected to ultraviolet rays irradiation and an even layer having a thickness of 15 Å was formed on the disk surface by dipping in a chloroform solution containing 4,4'-diaminodibenzo-18-crown-6 in a concentration of 2 mmol/l (0.781 g/l).

The resulting disk was then immersed in a chloroform for 5 minutes and was raised to leave an even layer having a thickness of 6 Å on the disk surface.

An even layer having a thickness of 18 Å was formed on the disk surface by dipping in a PF5080 solution containing perfluoropolyether Fomblin Z DOL (OHs at both ends; average molecular weight: 2,000; manufactured by Mount Edison) in a concentration of 1 g/l.

The disk on which the lubricant layer was formed was subjected to a spin-off test in the same manner as in Example 3. The results are shown in Table 1.

Comparative Example 1

The same disk as used in Example 1 was immersed in a methanol solution containing potassium stearate in a concentration of 1 mmol/l (0.316 g/l) for 5 minutes and was raised at a rate of 10 mm/s to form a lubricant layer having a thickness of 13 Å on the disk surface.

The disk on which the lubricant layer was formed was subjected to a lubricating performance test and a cohesion test in the same manner as in Example 1. In the lubricating performance test, the friction force was measured after 10 minutes and after 2 hours of continuous sliding. The results are shown in Tables 2 and 3.

Comparative Example 2

The same disk as used in Example 1 was immersed in a chloroform containing stearic acid in a concentration of 3 mmol/l (0.852 g/l) for 5 minutes and was raised at a rate of 10 mm/s to form a lubricant layer having a thickness of 16 Å on the disk surface.

The disk on which the lubricant layer was formed was subjected to a lubricating performance test and a cohesion test in the same manner as in Example 1. The results are shown in Table 2.

Comparative Example 3

The same disk as used in Example 1 was immersed in a chloroform containing β-(N,N-diheptadecylaminocarbonyl)-propionic acid in a concentration of 1 mmol/l (0.593 g/l) for 5 minutes and was raised at a rate of 10 mm/s to form an even lubricant layer having a thickness of 28 Å on the disk surface.

The disk on which the lubricant layer was formed was subjected to a lubricating performance test and a cohesion test in the same manner as in Example 1. In the lubricating performance test, the friction force was measured after 10 minutes and after 2 hours of continuous sliding. The results are shown in Table 2.

Comparative Example 4

A hydrogenated carbonaceous protective layer was formed on the same disk as used in Example 3 and an even layer having a thickness of 20 Å was formed on the disk surface by dipping in a PF5080 solution containing DEMNUM SH (average molecular weight: 1,650) in a concentration of 0.5 mmol/l.

The disk on which the lubricant layer was formed was subjected to a spin-off test in the same manner as in Example 3. The results are shown in Table 1.

Comparative Example 5

A hydrogenated carbonaceous protective layer was formed on the same disk as used in Example 3 and an even layer having a thickness of 31 Å (Comparative Example 5-1, for a spindle test) or 27 Å (Comparative Example 5-2, for a CSS test) was formed on the disk surface by dipping in a PF5080 solution containing DEMNUM SH (average molecular weight: 2,400) in a concentration of 0.6 mmol/l.

The disk on which the lubricant layer was formed was subjected to a spindle test or a CSS test in the same manner as in Example 3. The results are shown in Table 1. No stain was observed on either the disk or the head after the CSS test.

Comparative Example 6

A hydrogenated carbonaceous protective layer was formed on the same disk as used in Example 3 and an even layer having a thickness of 41 Å was formed on the disk surface by dipping in a PF5080 solution containing DEMNUM SH (average molecular weight: 2,400) in a concentration of 0.6 mmol/l.

The disk on which the lubricant layer was formed was subjected to a spin-off test in the same manner as in Example 3. The results are shown in Table 1.

Comparative Example 7

A hydrogenated carbonaceous protective layer was formed on the same disk as used in Example 3 and an even layer having a thickness of 21 Å (Comparative Example 7-1, for a spindle test) or 16 Å (Comparative Example 7-2, for a CSS test) was formed on the disk surface by dipping in a PF5080 solution containing perfluoropolyether Fomblin Z DOL (average molecular weight: 2,000) in a concentration of 1 g/l.

The disk on which the lubricant layer was formed was subjected to a spindle test or a CSS test in the same manner as in Example 3. The results are shown in Table 1. No stain was observed on either the disk or the head after the CSS test.

Example 7

The same disk as used in Example 1 was dipped in a mixture of chloroform and methanol containing 4,4'-diaminodibenzo-18-crown-6, potassium hydroxide and stearic acid, each in a concentration of 1 mmol/l to form an even lubricant layer having a thickness of 21 Å on the disk surface.

The disk on which the lubricant layer was formed was subjected to a lubricating performance test and a cohesion test in the atmosphere at a temperature of 25° C. and a humidity of 40% RH in the same manner as in Example 1. The results are shown in Table 2.

Example 8

The same disk as used in Example 1 was dipped in a mixture of chloroform and methanol containing 4,4'-diaminodibenzo-18-crown-6, potassium hydroxide and β-(N,N-diheptadecylaminocarbonyl)propionic acid, each in a concentration of 1 mmol/l to form an even lubricant layer having a thickness of 33 Å on the disk surface.

The disk on which the lubricant layer was formed was subjected to a lubricating performance test and a cohesion test in the same manner as in Example 7. The results are shown in Table 2.

Example 9

The same disk as used in Example 1 was dipped in a chloroform solution containing 4,4'-diaminodibenzo-18-crown-6 in a concentration of 2 mmol/l to form an even layer having a thickness of 12 Å on the disk surface. The resulting disk was then immersed in a mixture of chloroform and methanol containing β-(N,N-diheptadecylaminocarbonyl)propionic acid and potassium hydroxide, each in a concentration of 1 mmol/l, and was raised to form an even lubricant layer having a thickness of 33 Å on the disk surface.

The disk on which the lubricant layer was formed was subjected to a lubricating performance test and a cohesion test in the same manner as in Example 7. The results are shown in Table 2.

Example 10

The same disk as used in Example 1 was dipped in a chloroform solution containing 4,4'-diaminodibenzo-18-crown-6 in a concentration of 2 mmol/l to form an even layer having a thickness of 14 Å on the disk surface. The resulting disk was immersed in a chloroform for 5 minutes and was raised at a rate of 2 mm/s to leave an even layer having a thickness of 8 Å on the disk surface. The disk was then immersed in a mixture of chloroform and methanol containing β-(N,N-diheptadecylaminocarbonyl)propionic acid and potassium hydroxide, each in a concentration of 1 mmol/l, and was raised to form an even lubricant layer having a thickness of 26 Å.

The disk on which the lubricant layer was formed was subjected to a lubricating performance test and a cohesion test in the same manner as in Example 7. The results are shown in Table 2.

Example 11

The same disk as used in Example 1 was immersed in a mixture of chloroform and methanol containing 4,4'-diaminodibenzo-18-crown-6 and stearic acid, each in a concentration of 1 mmol/l to form an even lubricant layer having a thickness of 17 Å on the disk surface.

The disk on which the lubricant layer was formed was subjected to a lubricating performance test and a cohesion test in the same manner as in Example 7. The results are shown in Table 3.

Example 12

The same disk as used in Example 1 was immersed in a mixture of chloroform and methanol containing 4,4'-diaminodibenzo-18-crown-6 and β-(N,N-diheptadecylaminocarbonyl)propionic acid, each in a concentration of 1 mmol/l to form an even lubricant layer having a thickness of 31 Å on the disk surface.

The disk on which the lubricant layer was subjected to a lubricating performance test and a cohesion test in the same manner as in Example 7. The results are shown in Table 3.

Example 13

The same disk as used in Example 1 was immersed in a chloroform solution containing 4,4'-diaminodibenzo-18-crown-6 in a concentration of 2 mmol/l (0.781 g/l) and was raised to form an even layer having a thickness of 14 Å on the disk surface.

The resulting disk was then immersed in a chloroform solution (1.26 g/l) containing potassium β-(N,N-diheptadecylaminocarbonyl)propionate in a concentration of 2 mmol/l and was raised to form an even lubricant layer having a thickness of 49 Å on the disk surface.

The disk on which the lubricant layer was formed was subjected to a lubricating performance test and a cohesion test in the atmosphere at a temperature of 25° C. and a humidity of 40% RH in the same manner as in Example 1. The results are shown in Table 2.

Example 14

Figure 7:
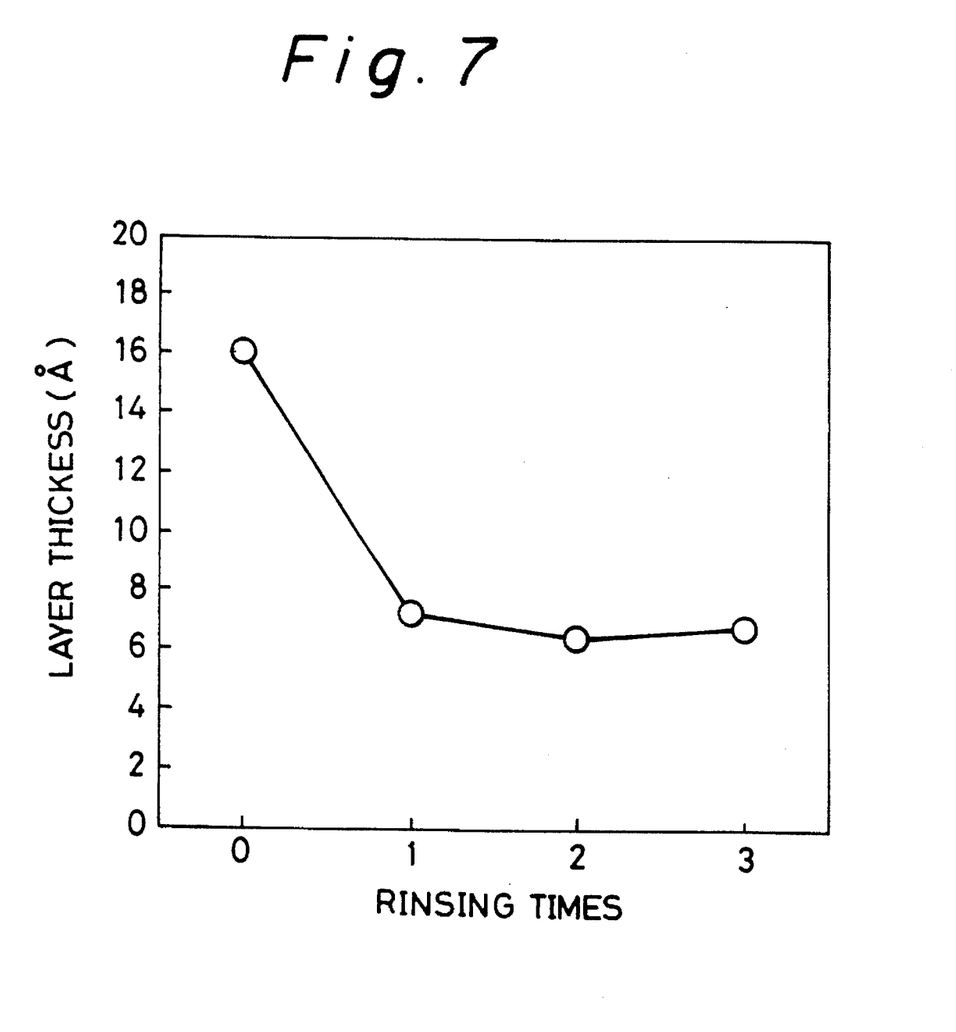

The same disk as used in Example 1 was immersed in a chloroform solution containing 4,4'-diaminodibenzo-18-crown-6 in a concentration of 2 mmol/l (0.781 g/l) and was raised to form an even layer having a thickness of 16 Å on the disk surface. The resulting disk was immersed in a chloroform solution for 5 minutes and was raised at a rate of 2 mm/s to leave an even fixed layer having a thickness of 7 Å on the disk surface. As shown in FIG. 7, this fixed layer was not removed after repeated (three times in total) rinsing with a chloroform solution in a similar manner, which means that 4,4'-diaminodibenzo-18-crown-6 used as a multidentate ligand in this Example strongly adheres to the carbonaceous protective layer.

The disk obtained through the above steps was immersed in a chloroform solution containing potassium β-(N,N-diheptadecylaminocarbonyl)propionate in a concentration of 2 mmol/l (1.26 g/l) and was raised to form an even lubricant layer having a thickness of 28 Å on the disk surface.

The disk on which the lubricant layer was formed was subjected to a lubricating performance test and a cohesion test in the same manner as in Example 13. The results are shown in Table 2.

Example 15

The same disk as used in Example 1 was immersed in a chloroform solution containing potassium stearate and 4,4'-diaminodibenzo-18-crown-6, each in a concentration of 1 mmol/l and was raised to form an even lubricant layer having a thickness of 17 Å on the disk surface.

The disk on which the lubricant layer was formed was subjected to a lubricating performance test in the same manner as in Example 1 to measure the friction force after 10 minutes and after 2 hours of continuous sliding. The results are shown in Table 3.

Example 16

The same disk as used in Example 1 was immersed in a chloroform solution containing potassium stearate in a concentration of 1 mmol/l and dibenzo-18-crown-6 in a concentration of 2 mmol/l (1.03 g/l in total) and was raised to form an even lubricant layer having a thickness of 16 Å on the disk surface.

This Example was carried out to confirm the lubricating performance under a condition in which the dibenzo-18-crown-6 was present in the system in a large excess when compared to potassium stearate, namely, the absence of free potassium stearate.

The disk on which the lubricant layer was formed was subjected to a lubricating performance test in the same manner as in Example 15. The results are shown in Table 3.

Example 17

The same disk as used in Example 1 was immersed in a chloroform solution containing stearylamine and dibenzo-18-crown-6, each in a concentration of 1 mmol/l (1.89 g/l in terms of a complex) and was raised to form an even lubricant layer having a thickness of 24 Å on the disk surface.

The disk on which the lubricant layer was formed was subjected to a lubricating performance test in the same manner as in Example 15. The results are shown in Table 3.

Comparative Example 8

The same disk as used in Example 1 was immersed in a chloroform solution containing stearylamine in a concentration of 3 mmol/l (0.809 g/l) and was raised to form a lubricant layer having a thickness of 25 Å on the disk surface.

The disk on which the lubricant layer was formed was subjected to a lubricating performance test in the same manner as in Example 14. The results are shown in Table 3.

Example 18

The same disk as used in Example 1 was immersed in a methanol solution containing cycloinulohexaose and potassium $\beta$-(N,N-diheptadecylaminocarbonyl)propionate were dissolved, each in a concentration of 1 mmol/l and was raised to form an even lubricant layer having a thickness of 23 Å on the disk surface.

The disk on which the lubricant layer was formed was subjected to a lubricating performance test and a cohesion test in the atmosphere at a temperature of 60° C. and a humidity of 80% RH. The results are shown in Table 4.

Example 19

The same disk as used in Example 1 was immersed in a methanol solution containing cycloinulohexaose, $\beta$-(N,N-diheptadecylaminocarbonyl)propionic acid and potassium hydroxide were dissolved, each in a concentration of 1 mmol/l and was raised to form an even lubricant layer having a thickness of 30 Å on the disk surface.

The disk on which the lubricant layer was formed was subjected to a lubricating performance test and a cohesion test in the same manner as in Example 18. The results are shown in Table 4.

Example 20

The same disk as used in Example 1 was immersed in a methanol solution containing cycloinulohexaose in a concentration of 1 mmol/l and was raised to form an even layer having a thickness of 16 Å on the disk surface. The resulting disk was then immersed in a chloroform solution containing potassium $\beta$-(N,N-diheptadecylaminocarbonyl)propionate in a concentration of 2 mmol/l and was raised to form an even lubricant layer having a thickness of 50 Å on the disk surface.

The disk on which the lubricant layer was formed was subjected to a lubricating performance test and a cohesion test in the same manner as in Example 18. The results are shown in Table 4.

Comparative Example 9

The disk on which the lubricant layer was formed in the same manner as in Comparative Example 3 was subjected to a lubricating performance test and a cohesion test in the same manner as in Example 18. The results are shown in Table 4.

Example 21

On a smooth aluminum alloy substrate having a diameter of 3.5 inches, 1,200 Å of a chromium undercoating layer and 500 Å of a magnetic layer of a cobalt alloy were formed by sputtering. 200 Å of a hydrogenated carbonaceous protective layer was further formed on the disk. The surface of the resulting disk was irradiated with ultraviolet rays having a wavelength of 185 nm and 254 nm and an output of 90 W from a distance of 15 mm for 5 minutes in the air.

The surface of the hydrogenated carbonaceous protective layer was analyzed by XPS using an AlK$\alpha$ rays, 14 kv-300 W, monochromator as an X-ray source, for an analysis area of 0.8×3.5 mm and an outlet angle of 65° (analysis depth: up to −50 Å). As a result, oxygen was contained in 20 atm %. The ratio of the C=O bond to the C—H bond and C—C bond changed from 0.04 before the surface treatment to 0.10 after the surface treatment. This means that the acidic functional groups on the surface of the hydrogenated carbonaceous protective layer had increased.

The resulting disk was immersed in a chloroform solution containing 4,4'-diaminodibenzo-18-crown-6 in a concentration of 2 mmol/l (0.781 g/l) to form an even layer having a thickness of 20 Å on the disk surface. This disk was then immersed in a chloroform for 5 minutes and was raised at a rate of 2 mm/s to leave an even layer having a thickness of 12 Å on the disk surface.

The disk was then immersed in a methanol solution containing potassium stearate in a concentration of 1 mmol/l (0.314 g/l) and was raised to form an even lubricant layer having a thickness of 19 Å.

The disk on which the lubricant layer was formed was subjected to a CSS test in the same manner as in Example 3 and a cohesion test in the atmosphere at a temperature of 25° C. and a humidity of 40% RH in the same manner as in Example 1. The results are shown in Table 5.

Example 22

The same disk as used in Example 21 was subjected to ultraviolet rays irradiation and was immersed in a chloroform solution containing 4,4'-diaminodibenzo-18-crown-6 in a concentration of 2 mmol/l (0.781 g/l) to form an even layer having a thickness of 17 Å on the disk surface.

The resulting disk was immersed in a chloroform for 5 minutes and was raised at a rate of 2 mm/s to leave an even layer having a thickness of 12 Å on the disk surface.

The disk was then immersed in a chloroform solution containing potassium β-(N,N-diheptadecylaminocarbonyl-)propionate in a concentration of 2 mmol/l (1.26 g/l) and raised to form an even lubricant layer having a thickness of 38 Å.

The disk on which the lubricant layer was formed was subjected to a CSS test and a cohesion test in the same manner as in Example 21. The results are shown in Table 5.

Example 23

The same disk as used in Example 1 was subjected to ultraviolet rays irradiation and was immersed in a chloroform solution containing potassium stearate and dibenzo-18-crown-6, each in a concentration of 1 mmol/l (0.674 g/l in total) to form an even lubricant layer having a thickness of 26 Å on the disk surface.

The disk on which the lubricant layer was formed was subjected to a CSS test and a cohesion test in the same manner as in Example 21. The results are shown in Table 5.

Example 24

The same disk as used in Example 1 was subjected to ultraviolet rays irradiation and was immersed in a chloroform solution containing potassium β-(N,N-diheptadecylaminocarbonyl)propionate and 4,4'-diaminodibenzo-18-crown-6, each in a concentration of 1 mmol/l (1.02 g/l) to form an even lubricant layer having a thickness of 36 Å on the disk surface.

The disk on which the lubricant layer was formed was subjected to a CSS test and a cohesion in the same manner as in Example 21. The results are shown in Table 5.

Comparative Example 10

Using the same disk as used in Example 21 but without irradiating it with ultraviolet rays, an even lubricant layer having a thickness of 20 Å was formed on the disk surface by immersing in a fluorocarbon solution containing perfluoropolyether (Fomblin Z DOL, manufactured by Mount Edison) in a concentration of 1 g/l.

The disk on which the lubricant layer was formed was subjected to a CSS test in the same manner as in Example 21. The results are shown in Table 5.

Reference Example

Without irradiating the disk having formed thereon a hydrogenated carbonaceous protective layer in the same manner as in Example 21 with ultraviolet rays, a layer having a thickness of 12 Å, 15 Å, or 18 Å was formed on the respective disk surfaces by immersing in a chloroform solution containing 4,4'-diaminodibenzo-18-crown-6 in a concentration of 2 mmol/l (0.781 g/l).

The resulting disk was immersed in a chloroform for 5 minutes and was raised at a rate of 2 mm/s. The results showed that the coated layer had hardly remainder adhered to the disk surface.

Example 25

The same disk as used in Example 1 was immersed in a chloroform containing copper stearate and 1,4,8,11-tetraazacyclo-tetradecane, each in a concentration of 1 mmol/l to form an even lubricant layer having a thickness of 16 Å on the disk surface.

The disk on which the lubricant layer was formed was subjected to a lubricating performance test and a cohesion test in the same manner as in Example 1. The results are shown in Table 2.

Example 26

The same disk as used in Example 1 was immersed in a mixture of water and methanol containing silver acetate and N,N'-dibenzyl-4,13-diaza-18-crown-6, each in a concentration of 1 mmol/l to form a coated layer having a thickness of 6 Å on the disk surface. Then, to the resultant disk using a chloroform solution containing β-(N,N-diheptadecylaminocarbonyl)propionic acid in a concentration of 2 mmol/l, a lubricant layer having a total thickness of 19 Å was formed.

The disk on which the lubricant layer was formed was subjected to a lubricating performance test and a cohesion test in the same manner as in Example 1. The results are shown in Table 2.

TABLE 1

|  | Initial thickness of lubricant layer (Å) | Spindle test Residual thickness of lubricant layer (%) | | | | CSS test torque (gf · cm) | |
|---|---|---|---|---|---|---|---|
|  |  | 1 day | 4 days | 7 days | 14 days | Initiation of rotation | During sliding |
| Example 3 | 25 | 81 | 71 | 71 | 67 | 28 | 11 |
| Example 4-1 | 26 | 85 | 82 | 81 | 79 |  |  |
| Example 4-2 | 24 |  |  |  |  | 35 | 8 |
| Example 5 | 44 | 84 | 79 | 78 | 75 | — | — |
| Example 6 | 18 | 80 | 79 | 79 | 78 | — | — |
| Comparative Example 4 | 20 | 67 | 57 | 57 | 52 | — | — |
| Comparative Example 5-1 | 31 | 76 | 71 | 68 | 65 |  |  |
| Comparative Example 5-2 | 27 |  |  |  |  | 50 | 8 |
| Comparative | 41 | 72 | 69 | 67 | 64 | — | — |

TABLE 1-continued

| | Initial thickness of lubricant layer (Å) | Spindle test Residual thickness of lubricant layer (%) | | | | CSS test torque (gf · cm) | |
|---|---|---|---|---|---|---|---|
| | | 1 day | 4 days | 7 days | 14 days | Initiation of rotation | During sliding |
| Example 6 Comparative Example 7-1 | 21 | 76 | 59 | 53 | 45 | | |
| Comparative Example 7-2 | 16 | | | | | 64 | 25 |

TABLE 2

| | Thickness of lubricant layer (Å) | Friction force (gf) | Cohesion (25° C./ 40% RH) | Head |
|---|---|---|---|---|
| Example 1 | 29 | 1.6 | None >32 days | a |
| Example 2 | 45 | 2.1 | None >32 days | a |
| Example 7 | 21 | 3.5 | None >35 days | b |
| Example 8 | 33 | 2.9 | None >35 days | b |
| Example 9 | 33 | 2.8 | None >35 days | b |
| Example 10 | 26 | 2.8 | None >35 days | b |
| Example 13 | 49 | 1.6 | None >32 days | a |
| Example 14 | 28 | 1.8 | None >32 days | a |
| Example 25 | 16 | 3.8 | None >14 days | b |
| Example 26 | 19 | 3.0 | None >14 days | b |
| Comparative Example 1 | 13 | 2.7 | Observed <3 days | a |
| Comparative Example 2 | 16 | 1.4 | Observed <3 days | a |
| Comparative Example 3 | 28 | 3.4 | Observed <3 days | b |

Head:
a: MnZn Ferrite
b: Al$_2$O$_3$.TiC

TABLE 3

| | Thickness of lubricant layer (Å) | Friction force after 10 min (gf) | Friction force after 2 hr (gf) | Head |
|---|---|---|---|---|
| Example 11 | 17 | — | 3.5 | b |
| Example 12 | 31 | — | 2.9 | b |
| Example 15 | 17 | 1.8 | 2.0 | a |
| Example 16 | 16 | 2.0 | 2.0 | a |
| Example 17 | 24 | 1.1 | 1.1 | a |
| Comparative Example 1 | 13 | 2.0 | 2.7 | a |
| Comparative Example 3 | 28 | 3.1 | 3.4 | b |
| Comparative Example 8 | 25 | 1.8 | Wear | a |

Head:
a: MnZn Ferrite
b: Al$_2$O$_3$.TiC

TABLE 4

| | Thickness of lubricant layer (Å) | Friction* force (gf) | Cohesion (60° C./80% RH) |
|---|---|---|---|
| Example 18 | 23 | 3.6 | None (>15 days) |
| Example 19 | 32 | 3.8 | None (>15 days) |
| Example 20 | 50 | 3.4 | None (>15 days) |
| Comparative | 28 | 3.4 | Observed (<1 |

TABLE 4-continued

| | Thickness of lubricant layer (Å) | Friction* force (gf) | Cohesion (60° C./80% RH) |
|---|---|---|---|
| Example 9 | | | day) |

*Head: Al$_2$O$_3$.TiC

TABLE 5

| | CSS test* | | | Cohesion test (25° C./ 40% RH) after 14 days |
|---|---|---|---|---|
| | Stain on head and disk | Initiation torque | Torque during sliding | |
| Example 21 | None | 9 gfcm | 7 gfcm | None |
| Example 22 | None | 23 gfcm | 11 gfcm | None |
| Example 23 | None | 9 gfcm | 9 gfcm | None |
| Example 24 | None | 21 gfcm | 11 gfcm | None |
| Comparative Example 10 | None | 65 gfcm | 17 gfcm | — |

*Head: Al$_2$O$_3$.TiC

As is evident from the results shown in Table 2, it was confirmed that cohesion was observed on the lubricant layer of Comparative Examples 1 to 3 in which a lubricant alone was used, while such cohesion was prevented on the lubricant layer of Examples 1 and 2 according to the present invention even if the thickness thereof was thicker than those of Comparative Examples 1 to 3 (being slightly thicker due to the presence of the host layer). It was further found that the lubricant layer of Examples 1 and 2 had a lubricating performance and a driving performance comparable or superior to those of the systems containing a lubricant alone according to Comparative Examples 1 to 3.

Figure 8:
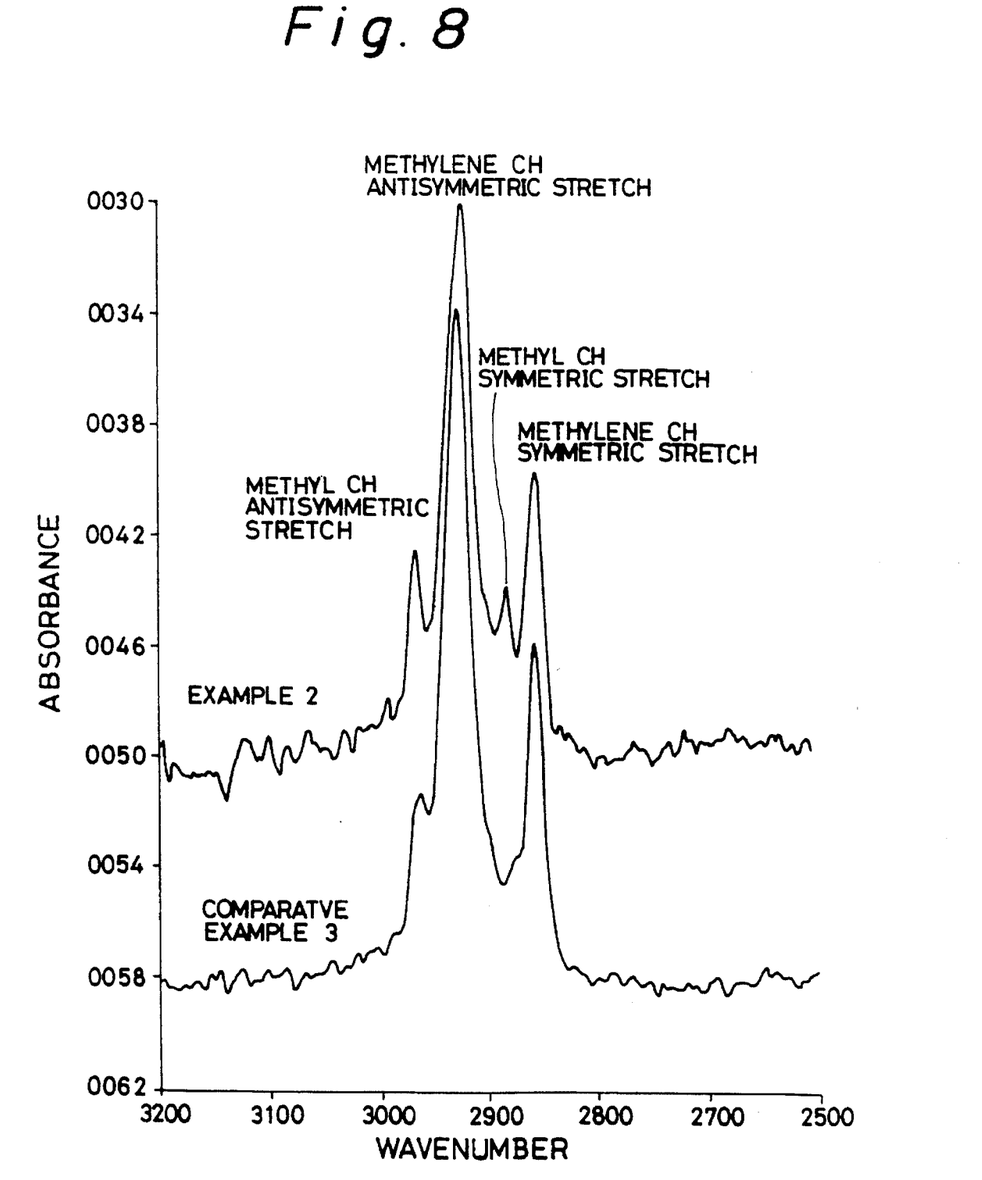

Further, the orientation of the alkyl chain in the lubricant layer prepared in Example 2 was analyzed by FTIR-RAS. As a result, as shown in FIG. 8, the CH stretching vibration attributed to a methyl group at the tip of the alkyl chain was clearly observed. It was also confirmed that the alkyl chain was oriented in such a good state as to be vertically oriented against the substrate since the intensity of the CH stretching vibration of the methylene chain was comparatively small.

Taking into account the layer thickness, it is considered that the binding site on the lubricant layer was oriented to the substrate and the layer is a mono layer having a structure such that the alkyl chain was arranged with being directed upward (FIG. 1), which is almost an optimal structure as a lubricant layer. On the contrary, in the conventional system composed of a lubricant (β-(N,N-diheptadecylaminocarbonyl)propionic acid) alone (Comparative Example 3), the intensity of absorbance based on the CH stretching vibration of the methyl group at the tip of the alkyl chain was small and the intensity of the CH stretching vibration of the methylene chain was large. Thus, it was found that the orientation of the alkyl chain on the disk was so poor that the alkyl chains were oriented in different directions.

From the results shown in Table 1, it was confirmed that, in the lubricant layer according to the present invention, even in the case where a liquid lubricant was used, the spin-off of the lubricant molecule was effectively prevented and the adhesion of the head as observed in the case of using a liquid lubricant hardly occurred. That is, in the lubricating system according to the present invention, such a spin-off was effectively prevented by having the lubricant compound adhered to the substrate using the host-guest complex lubricant layer. In addition, the fixation and lubricating performance did not use a tradeoff and the lubricant layer was constituted so as to have an excellent lubricating performance and a durability while hardly undergoing any adhesion.

When, on the one hand, a liquid lubricant, perfluoropolyether, was directly coated on a smooth disk (Comparative Examples 5 and 7), it is considered that the lubricant migrates on the surface and collects at the true contact region between the head and the disk to form a meniscus due to the low interaction between the lubricant and the surface of the protective layer. On the other hand, in the case in which a liquid lubricant was fixed on the smooth substrate using a host-guest complex (Examples 3 and 4), the torque at the initiation of rotation was lowered to 35 gf·cm or less.

From the results of Examples 7 to 10, it was confirmed that the lubricant layer formed using a multidentate ligand having a function to trap a metal ion, a metal compound, and a lubricating molecule having an active hydrogen independently as a material had an excellent lubricating performance and the cohesion of the lubricant molecule was prevented, similar to the lubricant layer formed by using the lubricant molecule, which had been isolated and purified as an alkaline metal salt, as a guest compound.

As shown in the results of Examples 13 and 14, it was found that the lubricant layer prepared by forming the multidentate ligand layer and then forming the lubricant molecule layer exhibited a lubricating performance comparable or superior to that of the lubricant layer fixed by using a-solution in which the lubricant molecule and crown ether had formed the host-guest complex (Example 2). It is considered that, in each case, the fixed host-guest complexes have a layer constitution such that the crown ether, which strongly interacts with the substrate as a whole, adheres to the surface of the disk and the lubricant molecule is coordinated thereon.

As is clear from the results shown in Table 3, it was found that the lubricant composed of potassium stearate and dibenzo-18-crown-6 (Examples 15 and 16) exhibited a more excellent lubricating performance than the lubricant composed of only potassium stearate according to Comparative Example 1. Further, it was found that the lubricant composed of stearylamine and dibenzo-18-crown-6 (Example 17) maintained an excellent lubricating performance for a long period of time as compared to the layer of Comparative Example 8, which resulted in wear.

The lubricant composed of β-(N,N-diheptadecylaminocarbonyl)propionic acid and 4,4'-diaminodibenzo-18-crown-6 (Example 2) showed a lubricating performance at the initial sliding stage comparable or superior to Comparative Example 3 in which β-(N,N-diheptadecylaminocarbonyl)propionic acid was used alone. The lubricating performance of Comparative Example 3 decreased considerably after 2 hours of continuous sliding, as compared to Examples which retained excellent lubricating performance at the initial stage with almost no change. Further, the coated layer of Comparative Example 3 readily became uneven, while the coated layer of Example 2 had not become uneven even after one month or more.

EFFECT OF THE INVENTION

The present invention provides a reliable lubricating system which is a thin layer having almost the same layer thickness as a mono layer with an excellent lubricating performance and abrasion resistance. In the case of the solid lubricant, the cohesion of the lubricant molecule can be prevented and, in the case of the liquid lubricant, an excellent durability can be maintained for a long period of time because of the prevention of spin-off. When using a smooth substrate to lower the lift of the head, adhesion to the head, which is inherent in the liquid lubricant, does not occur and a satisfactory lubricating performance and sufficient durability can be maintained. There is no problem of cohesion, which is inherent in the solid lubricant. When the lubricant layer is applied to a magnetic recording medium, the data recording density can be increased and a magnetic recording medium with long-term reliability can thus be obtained.

We claim:

1. A magnetic recording medium which comprises a non-magnetic substrate having successively formed thereon a thin film magnetic layer, a protective layer, and a lubricant layer wherein, said lubricant layer contains a host-guest complex lubricant of a host compound and a guest compound having a lubricating function, in which the host compound comprises a multidentate ligand having a function to reversibly trap an organic ion or a metal ion by electrostatic interaction.

2. The magnetic recording medium according to claim 1, wherein the quest compound of said host-guest complex lubricant comprises an organic or metal ion having a function to be reversibly trapped by the multidentate ligand of the host compound, said ion being bound to a moiety which imparts a lubricating function to the complex.

3. The magnetic recording medium according to claim 1, wherein said host compound is coated on the surface of the protective layer.

4. The magnetic recording medium according to claim 1, wherein said multidentate ligand has terminal functional groups providing an electrostatic interaction with each other.

5. The magnetic recording medium according to claim 1, wherein said multidentate ligand is a compound having three or more atoms of at least one element selected from the group consisting of oxygen nitrogen, and sulfur.

6. The magnetic recording medium according to claim 1, wherein said host compound is a cyclic multidentate ligand and corresponding donor atoms contain a lone electron pair having an $sp^3$ hybrid orbital.

7. The magnetic recording medium according to claim 1, wherein said host compound is a crown ether having terminal hydroxyl groups.

8. The magnetic recording medium according to claim 1, wherein said host compound is a cyclofructan.

9. The magnetic recording medium according to claim 1, wherein the guest compound is derived from a compound having 8 or more carbon atoms and having an active hydrogen at one terminal.

10. A magnetic recording medium which comprises a non-magnetic substrate having successively formed thereon a magnetic layer, a carbonaceous protective layer, and a lubricant layer, wherein said lubricant layer contains a host-guest complex lubricant, in which a lubricant molecule is used as a guest compound and a multidentate ligand is used as a host compound, and is arranged on the surface of the carbonaceous protective layer which has been treated so as to increase the number of acidic functional groups.

11. A magnetic recording medium which comprises a non-magnetic substrate having successively formed thereon a magnetic layer, a carbonaceous protective layer, and a lubricant layer, wherein the surface of said carbonaceous protective layer has a ratio of the C=O bond to the C—C bond and the C—H bond ranging from 0.05 to 0.3 and the lubricant layer contains a host-guest complex lubricant in which a lubricant molecule is used as a guest compound and a multidentate ligand is used as a host compound.

12. The magnetic recording medium according to claim 11, wherein said ratio of the C=O bond to the C—C bond and the C—H bond ranges from 0.07 to 0.2.

13. The magnetic recording medium according to claim 10 or 11, wherein said multidentate ligand contains three or more atoms of at least one element selected from the group consisting of oxygen, nitrogen, and sulfur and has a function to trap a metal ion or an organic ion.

14. The magnetic recording medium according to claim 10 or 11, wherein said multidentate ligand has one or more basic functional groups.

* * * * *